April 7, 1931.  F. W. MERRILL  1,800,027
SINGLE UNIT FREQUENCY CHANGER
Original Filed Dec. 23, 1927  3 Sheets-Sheet 1

Inventor:
Frank W. Merrill,
by [signature]
His Attorney.

April 7, 1931.  F. W. MERRILL  1,800,027
SINGLE UNIT FREQUENCY CHANGER
Original Filed Dec. 23, 1927   3 Sheets-Sheet 2
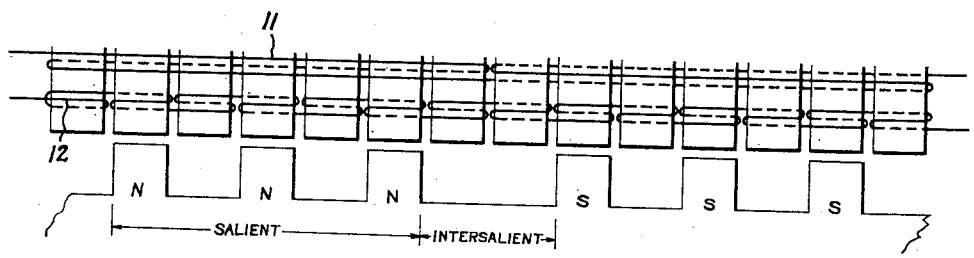
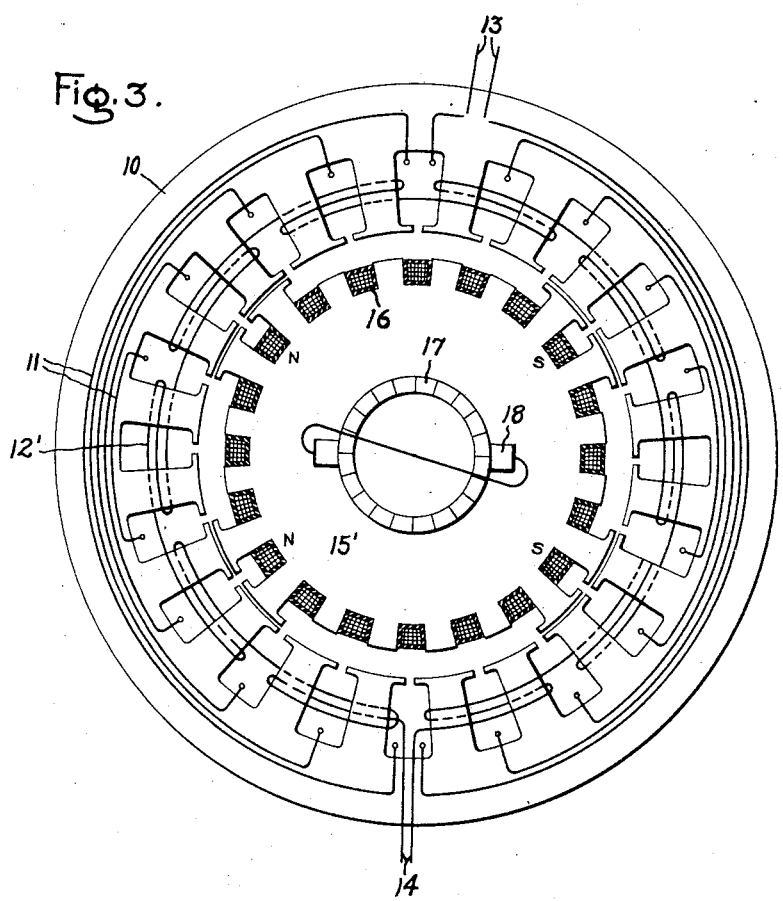
Inventor:
Frank W Merrill,
by *Alexander S Lure*
His Attorney April 7, 1931.  F. W. MERRILL  1,800,027
SINGLE UNIT FREQUENCY CHANGER
Original Filed Dec. 23, 1927  3 Sheets-Sheet 3
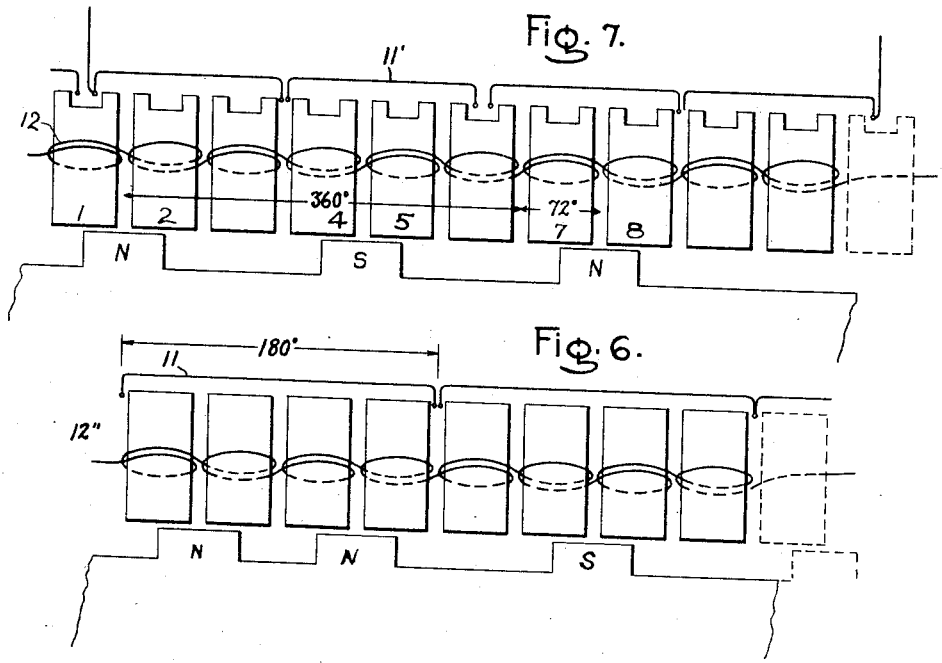
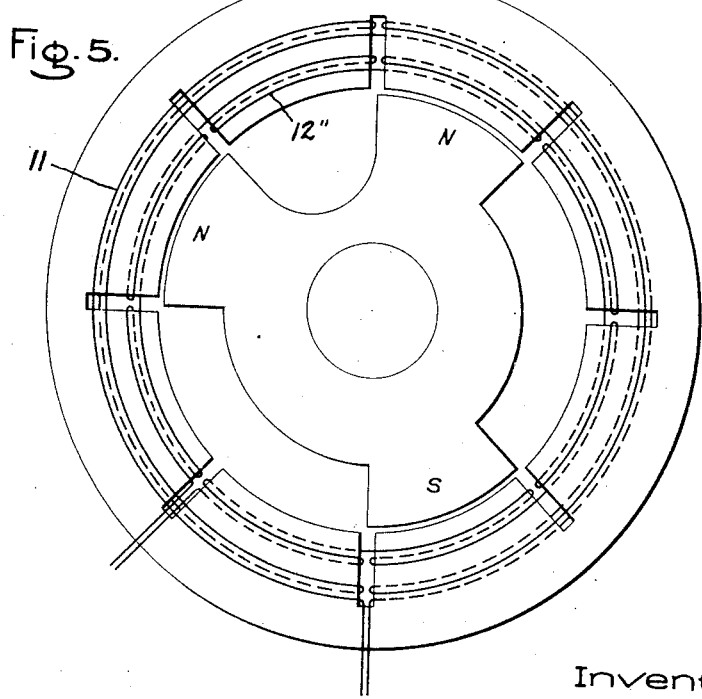
Inventor:
Frank W. Merrill,
by
His Attorney.

Patented Apr. 7, 1931

1,800,027

UNITED STATES PATENT OFFICE

FRANK W. MERRILL, OF FORT WAYNE, INDIANA, ASSIGNOR TO GENERAL ELECTRIC COMPANY, A CORPORATION OF NEW YORK

SINGLE-UNIT FREQUENCY CHANGER

Application filed December 23, 1927, Serial No. 242,230. Renewed January 13, 1931.

My invention relates to frequency changer apparatus and its object is to provide a frequency changer machine consisting of a single unit having certain novel and advantageous features which will be explained hereinafter. The frequency changer machine of my invention is particularly useful where it is desired to obtain a frequency higher than is normally available.

In carrying my invention into effect I provide a dynamo electric machine having single rotor and stator elements. The primary element, preferably the stator, is fitted with two electrically independent windings, one of which, called the fundamental winding, is adapted to be connected to the available alternating current source of power causing the rotor member, which is preferably the secondary, to start and to rotate synchronously as a synchronous reaction motor. The secondary member is provided with polar salients which provide a source of substantially constant unidirectional flux at synchronous speed. This flux, turning synchronously with the revolving field set up by the primary line frequency, generates high frequency electromotive forces in the other, or generating, winding of the primary member as in a revolving field alternator and distinguishes from the inductor alternator in this respect. The generating winding is of short pitch and is wound for a greater number of poles than the fundamental winding, the ratio of the poles in the two windings depending upon the particular value of high frequency desired. The high frequency obtainable from the generating winding in this manner may be classified into three groups: I, the odd multiples of line frequency such as 3, 5, 7, etc.; II, the even multiples of line frequency such as 2, 4, 6, etc.; III, the fractional multiples of line frequency such as 1½, 2½, 3⅓, etc. For the sake of convenience the ratio between the generated frequency and the fundamental frequency will hereinafter be referred to as the frequency factor of the machine.

Figure 1:
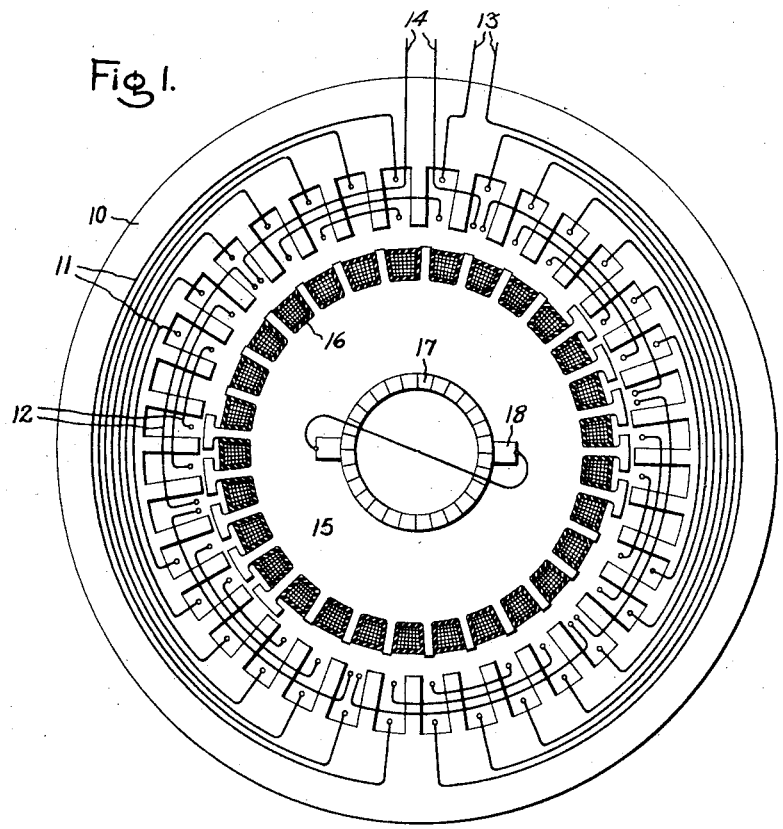
Figures 1A, 2:
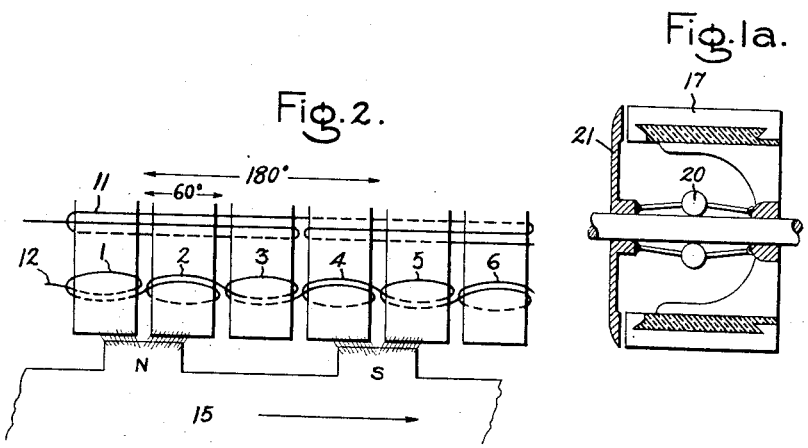

Each of the above groups requires a somewhat different arrangement of the secondary salients and primary generating coils and in order to obtain better understanding of the invention I will describe several examples of the invention in connection with the accompanying drawings in which Fig. 1 represents an embodiment, and Fig. 2 an explanatory diagram of a machine of group I, arranged for a frequency factor of 3; Fig. 1a represents a form of centrifugal switch which may be employed with the machine of Fig. 1 in connection with the starting winding to be described; Fig. 3 is an embodiment of a group I machine arranged for a frequency factor of 5; Fig. 4 is an explanatory diagram for a group I machine in which the frequency factor is 7; Figs. 5 and 6 represent an embodiment and an explanatory diagram respectively of a machine of group II arranged for a frequency factor of 4; and Fig. 7 is an explanatory diagram for a group III machine having a frequency factor of 2½.

The features of my invention which are believed to be novel and patentable will be pointed out in the claims appended hereto.

The single unit, self-driven frequency changer represented in Fig. 1 is a machine of group I and has a frequency factor of 3, that is, it is designed to multiply the line or fundamental frequency with which it is supplied three times and consequently if supplied at 60 cycles would yield 180 cycles from its generating winding. The primary member is the stator 10 and it is provided with a fundamental 2-pole energizing winding 11 wound in the bottom of the slots of the stator 10 and a 6-pole generating winding 12 wound in the tops of the slots. Only the end connections for one end of the machine are shown but it will be understood that these windings represented are single phase distributed windings and that the coils of each winding are connected in series to produce alternate north and south poles. The fundamental winding 11 is provided with terminals 13 to connect with the source of supply and the generating winding 12 is provided with terminals 14 to connect with the high frequency system to be supplied. Either or both of these windings might be polyphase windings, but single phase windings are represented for the sake of simplicity. The secondary member 15 is provided with a secondary or starting winding for causing it to start and rotate and with polar salients for establishing synchronous rotation and the necessary unidirectional polar fluxes of the machine. In this case the secondary winding is similar to that employed for alternating current commutator motors of the repulsion type. This winding represented at 16 is connected to a commutator 17 which is short-circuited through brushes 18 and serves primarily to start the machine and bring it up to approximately synchronous speed. An ordinary squirrel cage winding might be substituted if a polyphase fundamental winding were used. This machine has two polar salients formed by cutting off certain of the rotor teeth leaving two groups of five complete teeth on opposite sides of the rotor producing a 2-pole rotor. The bipolar rotating field produced by the fundamental winding 11 causes the bipolar rotor to rotate in exact synchronism as a reaction motor and at the same time this bipolar high density flux is properly spaced with respect to and cuts the coils of the generating winding 12 to produce a voltage of three times the fundamental frequency therein. Consequently, a current of three times the fundamental frequency may be drawn off from the terminals at 14.

The reason why this happens may be made clearer from a consideration of Fig. 2. Let the part 15 represent the rotor of Fig. 1 developed and the parts marked N and S the 2-polar salients. 11 and 12 represent the fundamental and generating windings on the stator. It may be noted from Fig. 1 that the angular span of a rotor salient is approximately the same as the span of one of the coils of the generating winding and one-third of the span of one of the fundamental coils. For the sake of convenience the coils of the generating winding are numbered from 1 to 6 in Fig. 2. Note that the odd numbered coils are wound in one direction and the even numbered coils in the other direction. With a rotation in the direction represented by the arrow it is seen that under the N pole the flux is decreasing through coil 1 and increasing through coil 2 while under the S pole the flux is decreasing through coil 4 and increasing through coil 5. However, since the flux is in the opposite direction at N and S the electromotive force of coils 1, 2, 4 and 5 add. Consequently two-thirds of the stator coils are active to generate a voltage of three times fundamental frequency.

The generating winding 12 shown in Fig. 1 is just the same as would be furnished if the rotor were to be six poles direct current excited. The method of generation is also similar except that four of the poles are omitted. The two remaining poles have the same angular span as the pole pitch of the 6-pole winding and serve the double purpose of "rotor" salients for a two-pole synchronous motor and generator field for a 6-pole generating winding.

In Fig. 1 we have one generating salient for each fundamental pole salient which is about two-thirds of the normal width of salient in a well designed 2-pole synchronous reaction type motor. If it is desired to have a frequency factor of 5 instead of three, we could provide ten generating coils where we now have six. However, such a construction would be uneconomical because the active rotor salients would have to be narrowed still more. Consequently, it is desirable to go to the arrangement shown in Fig. 3 where two generating salients per fundamental pole salient are employed to obtain a frequency factor of 5. This is possible because of the greater number of high frequency or generating coils per fundamental pole salient.

In Fig. 3 the parts which remain similar to those of Fig. 1 are indicated by like reference characters. The number of generating coils of the winding 12' is increased to 10 and the rotor 15' is provided with two auxiliary salients per pole, N designating those of one pole and S those of the other pole of reversed polarity.

The N salients are in line or spaced with generating coils wound in one direction and the S salients are in line with generating coils wound in the opposite direction so that the electromotive forces of the eight active generating coils add to produce a frequency five times the fundamental frequency. The flux distribution of the main polar salients is such as to produce two auxiliary poles of like polarity spaced with respect to alternate poles of the generating winding. The same principle may be carried out for higher odd frequency factors; for example, for a frequency factor of 7 we may have three generating salients per fundamental pole, for a frequency factor of 9 four generating salients per fundamental pole, and for a frequency factor of 11, five generating salients per pole. It is unnecessary to illustrate all of these arrangements because the same principles apply. However, an explanatory showing of the arrangement for a frequency factor of 7 with three generating salients per main pole is represented in Fig. 4 where 11 represents the 2-pole fundamental winding, 12 the fourteen pole generating winding, and N and S the rotor generating salients of which there are three for each fundamental pole. It is seen that each time the frequency factor is raised the fundamental salients become spread out and the intersalients narrowed down; but there is always twice as much space between fundamental salients as there is between the generating salients of the same polarity so that the rotor retains the character of a 2-pole synchronous reaction motor rotor.

In Fig. 5 is represented a machine of group II having a frequency factor of 4. The two pole fundamental winding is represented at 11 and the 8-pole generating winding at 12″. The rotor is unsymmetrical in regard to the number of salients on the main poles. Thus salients NN represent one main pole and S the pole of opposite polarity. Since the distance between the two N salients is considerably less than the distance between the N and S salients the rotor will run synchronously as a reaction motor. The rotor may be suitably balanced to offset the non-symmetrical arrangement of the salients. The starting winding for the rotor is omitted in Fig. 5.

In Fig. 6 the stator and rotor of Fig. 5 is developed where it will be evident that the electromotive forces in the generating coils will add but that not all of them are active at one time. This machine if supplied at 60 cycles will generate a 240 cycle current in the generating winding. The same scheme may be carried out for other frequency ratio machines of group II. For example, for a frequency ratio of 6 we would provide twelve coils in the generating winding and two generating salients on one side of the rotor and three on the other. For a frequency factor of 8, we would provide sixteen generating coils on the stator and three rotor salients on one side of the rotor of one polarity and four salients on the other side of the other polarity.

It will be noted that for both the group I machines of Figs. 1 and 3 and 4, and the group II machines just discussed the total number of generating salients that may be used per pair of fundamental poles is equal to the frequency factor minus 1. Thus, for the machine of Fig. 1 the number of generating salients is $3-1=2$, and for Fig. 5 it is $4-1=3$.

In Fig. 7 is diagrammatically represented a machine of group III where the frequency factor is 2½, 11 represents a 4-pole fundamental winding, 12 a 10-pole generating winding, and 15 the rotor member, having two salients of the same polarity spaced unsymmetrically, and a third salient of the opposite polarity located midway in the larger angle separating the two like salients. Assuming the circumference of the rotor corresponds to 720 electrical degrees the two like rotor salients, marked N, are spaced 432 degrees on one side and 288 degrees on the other. The odd salient, marked S, is placed exactly in the middle of the 432 degree space. Such spacing puts the two like salients under stator generating coils of like polarity, and puts the odd salient under a generating coil of opposite polarity. In the position of the rotor shown in Fig. 7 six generating coils 1, 2, 4, 5, 7, and 8 are active, out of a total of ten, and the voltages generated are all in the same direction and add up to produce the total high frequency voltage. The fractional arrangement shown in Fig. 7 obeys the rule that the number of salients per pair of fundamental poles equals the frequency factor minus one. Thus the frequency factor of 2½ less 1 equals 1½, 1½ per pair of poles gives three salients for the four-pole winding shown in Fig. 7.

In the Fig. 7 arrangement a large portion of the N flux which enters the rotor through the like salients returns through the odd S salient. Part of this flux, however, returns through the 288 degree space without producing definite polar effects. While this arrangement is unsymmetrical, it would probably run as a reaction motor. In case it did not operate satisfactorily as a motor, it could be made to generate the desired high frequency by driving it with another synchronous motor.

Having thus described the various forms of the invention I will now discuss a few factors relating to the practical design of such machines and particularly single phase frequency changers. The single phase frequency changer tends to produce undesirable harmonic currents but these may be largely eliminated by proper design. The starting winding shown in Figs. 1 and 3, aside from its principal use as a starting winding, is advantageously utilized to damp out certain harmonic fluxes when the machine is operating at synchronous speed and for this reason I prefer to provide the machine with means for completely short-circuiting the commutator as the machine approaches synchronous speed so as to convert this winding into an effective damper winding for detrimental harmonic fluxes. This may be done by providing some form of a short-circuiting device operated in response to centrifugal force such as is represented in Fig. 1a. When the machine approaches synchronous speed the weights 20 fly out and draw the short-circuit plate 21 along the shaft against the end of the commutator 17. The winding 16, Fig. 1, thus short-circuited becomes equivalent to an ordinary squirrel cage winding.

The tendency for harmonic currents to flow in the fundamental winding may be reduced by the distribution of said winding so as to make its flux wave as near a true sinusoidal wave as possible. Consequently the turns of the concentric winding 11 are preferably arranged in the slots to approximate a sine distribution of conductors. As this is a usual arrangement of concentric windings it does not need further explanation. Voltage ripples which might be produced in the output voltage waves by inductor action of the rotor teeth are avoided by spiralling the rotor teeth a small amount so as to break up voltage ripples. The slot area allotted to the fundamental and generating windings of the stator should be about equal. This proportion gives a lower current density for the high frequency generating winding but a low density and low resistance in this winding is desirable to improve the voltage regulation.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. A frequency changer comprising cooperating stator and rotor elements, one of which is provided with a multipolar primary winding and the other with corresponding polar salients, said parts constituting a synchronous reaction motor, a source of alternating current supply for said motor, a second winding on the primary winding member of a greater number of poles than that of said synchronous reaction motor, said polar salients being arranged for a flux distribution with respect to the pole number of said second mentioned winding so as to generate an alternating current therein of a higher frequency than that supplied to the synchronous reaction motor.

2. A combined synchronous reaction motor and alternating current generator employed as a frequency changer comprising a member having a multipolar alternating current energizing winding adapted to be energized at a given frequency, and an alternating current generating winding of a greater number of poles than the energizing winding, and a second member relatively rotatable with respect to said wound member having polar salients equal in number to the poles in the energizing winding and having a flux distribution spaced with respect to said generating winding so as to generate an alternating current therein of a higher frequency than that supplied to the energizing winding.

3. A frequency converter comprising a rotor provided with polar salients and a starting winding, a stator provided with a multipolar alternating current energizing winding which when energized at a given frequency causes said rotor to start and to run synchronously, a generating winding on said stator of a higher pole number than said energizing winding, said rotor salients serving to distribute the flux produced therein by the energized winding into groups spaced with respect to said generating winding so as to generate an alternating current therein having a higher frequency than that with which the energizing winding is supplied.

4. A frequency converter comprising a rotor provided with polar salients and a repulsion motor commutated winding, a stator member provided with a multipolar alternating current energizing winding which when energized at a given frequency causes said rotor to start and then to operate synchronously as a reaction motor, means for short-circuiting said commutated winding as the rotor comes up to its synchronous speed, a generating winding on said stator having a greater number of poles than said energizing winding, said rotor salients having a flux distribution which is spaced with respect to the pole number of the generating winding to cause the synchronously rotating flux field therein to generate a higher frequency current in said generating winding.

5. A frequency changer comprising a stator element, a pair of uniformly distributed alternating current windings on the stator element wound for different numbers of poles, a rotor element having polar salients corresponding to the pole number of one of the stator windings, such as to cause the rotor to operate as a synchronous reaction rotor when said stator winding is energized with alternating current of a given frequency and teeth in the salients of said rotor member spaced with respect to the pole number of the other winding of the stator so as to generate alternating currents of a higher frequency therein.

6. A frequency changer comprising cooperating stator and rotor elements, a multipolar alternating current energizing winding on the stator element, a source of supply therefor, salients on the rotor element corresponding to the pole number of said winding, said parts constituting a synchronous reaction motor, a second winding on said stator member of a greater number of poles than said first mentioned winding, and teeth in the salients of said rotor member spaced with respect to the pole number of said second mentioned winding so as to generate an alternating current therein of a higher frequency than that supplied to the first mentioned winding.

7. A frequency converter comprising a stator member having a multipolar alternating current energizing winding, a salient pole rotor member cooperating therewith to produce a synchronous reaction motor, a generating winding on said stator member having a greater number of poles than the energizing winding, and auxiliary polar salients in each main pole salient of said rotor spaced apart the distance of alternate poles of said generating winding.

8. A frequency converter comprising a stator member having a multipolar alternating current energizing winding, and a generating winding of a greater number of poles uniformly distributed about the stator, a rotor having polar salients corresponding to the pole number of the energizing winding, and auxiliary polar salients of like polarity spaced apart a distance corresponding to alternate poles of said generating winding.

9. A frequency converter comprising an $n$ pole synchronous reaction motor having cooperating primary and secondary members, $n$ being an even number, an $nx$ pole generating winding on the primary member, $x$ being a number greater than 1, the $n$ pole secondary member having a flux distribution such as to produce magnetic poles for said $nx$ pole generating winding.

10. A frequency converter comprising a single phase synchronous reaction motor having a primary member provided with a 2-pole energizing winding, a secondary member provided with two main polar salients and a commutated winding short-circuited on an axis to produce repulsion motor starting torque, a uniformly distributed generating winding on said primary member of a greater number of poles than that of the reaction motor pole number, the flux distribution of the secondary member being such as to produce magnetic poles for said generating winding.

11. A frequency converter comprising stator and rotor members, a multipolar alternating current energizing winding on the stator, polar salients of like pole number on the rotor, said parts comprising a synchronous reaction motor, a series connected alternating current generating winding on the stator member having a greater number of poles than the energizing winding, and teeth on the rotor member for distributing the reaction motor flux produced by said energizing winding into polar groups corresponding to the polarity and spacing of said generating winding.

In witness whereof I have hereunto set my hand this 20th day of December, 1927.

FRANK W. MERRILL.